(12) United States Patent
Yao et al.

(10) Patent No.: US 11,151,361 B2
(45) Date of Patent: Oct. 19, 2021

(54) DYNAMIC EMOTION RECOGNITION IN UNCONSTRAINED SCENARIOS

(71) Applicant: INTEL CORPORATION, Santa Clara, CA (US)

(72) Inventors: Anbang Yao, Beijing (CN); Dongqi Cai, Beijing (CN); Ping Hu, Beijing (CN); Shandong Wang, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 16/471,106

(22) PCT Filed: Jan. 20, 2017

(86) PCT No.: PCT/CN2017/071950
§ 371 (c)(1),
(2) Date: Jun. 19, 2019

(87) PCT Pub. No.: WO2018/133034
PCT Pub. Date: Jul. 26, 2018

(65) Prior Publication Data
US 2019/0325203 A1  Oct. 24, 2019

(51) Int. Cl.
*G06K 9/00* (2006.01)
*G06N 20/00* (2019.01)
(Continued)

(52) U.S. Cl.
CPC ....... *G06K 9/00302* (2013.01); *G06K 9/4628* (2013.01); *G06N 3/0481* (2013.01); *G06N 3/08* (2013.01); *G06N 20/00* (2019.01)

(58) Field of Classification Search
CPC .................. G06N 20/00; G16K 9/00302
See application file for complete search history.

(56) References Cited

U.S. PATENT DOCUMENTS 9,836,853 B1 * 12/2017 Medioni ................. G06T 7/246
9,842,105 B2 * 12/2017 Bellegarda ............ G06F 40/205
(Continued)

FOREIGN PATENT DOCUMENTS

| CN | 104992167 A | 10/2015 |
| CN | 106295566 A | 1/2017 |

OTHER PUBLICATIONS

International Search Report for Related PCT Application PCT/CN2017/071950 with a completion date of Aug. 28, 2017 and dated Oct. 19, 2017, 2 pages.
(Continued)

*Primary Examiner* — Wen W Huang
(74) *Attorney, Agent, or Firm* — Hanley, Flight & Zimmerman, LLC

(57) ABSTRACT

An apparatus for dynamic emotion recognition in unconstrained scenarios is described herein. The apparatus comprises a controller to pre-process image data and a phase-convolution mechanism to build lower levels of a CNN such that the filters form pairs in phase. The apparatus also comprises a phase-residual mechanism configured to build middle layers of the CNN via plurality of residual functions and an inception-residual mechanism to build top layers of the CNN by introducing multi-scale feature extraction. Further, the apparatus comprises a fully connected mechanism to classify extracted features.

25 Claims, 7 Drawing Sheets

(51) Int. Cl.
*G06K 9/46* (2006.01)
*G06N 3/04* (2006.01)
*G06N 3/08* (2006.01)

(56) References Cited

U.S. PATENT DOCUMENTS

| | | | | |
|---|---|---|---|---|
| 10,055,551 | B2* | 8/2018 | Agaian | G06K 9/66 |
| 10,685,281 | B2* | 6/2020 | Shan | G06N 3/08 |
| 2015/0139485 | A1* | 5/2015 | Bourdev | G06K 9/6292 |
| | | | | 382/103 |
| 2015/0347819 | A1* | 12/2015 | Yin | G06K 9/00288 |
| | | | | 382/118 |
| 2016/0162782 | A1* | 6/2016 | Park | G06N 3/082 |
| | | | | 706/17 |
| 2016/6275341 | | 9/2016 | Li et al. | |
| 2017/0206405 | A1* | 7/2017 | Molchanov | G06K 9/00355 |
| 2017/0243085 | A1* | 8/2017 | Vanhoucke | G06N 3/0454 |
| 2017/0262735 | A1* | 9/2017 | Ros Sanchez | G06K 9/4628 |
| 2018/0096243 | A1* | 4/2018 | Patil | G06N 3/0454 |
| 2018/0144465 | A1* | 5/2018 | Hsieh | G06N 3/08 |
| 2018/0374213 | A1* | 12/2018 | Arnold | A61B 5/0263 |
| 2020/0042871 | A1* | 2/2020 | Francini | G06K 9/6256 |

OTHER PUBLICATIONS

Lu et al.: "Convolutional neural network for facial expression recognition" Journal of Nanjing University of Posts and Telecommunications, ISSN 1673-5439, vol. 36, No. 1, p. 16-22 Abstract only Feb. 2016. 1 page.

Khorrami et al; "Do Deep Networks Learn Facial Action Units When Doing Expression Recognition?" Beckman Institute for Advanced Science and Technology, University of Illinois at Urbana-Champaign, Computer Vision Workshop (ICCVW) 2015 IEEE International Conference, Feb. 2016, 9 pages.

* cited by examiner

DYNAMIC EMOTION RECOGNITION IN UNCONSTRAINED SCENARIOS

BACKGROUND ART

Humans are capable of communication via the display of emotions. Dynamic emotion recognition aims to automatically identify human emotions spontaneously exhibited over time through analyzing captured face images. Dynamic emotion recognition has a wide range of applications including perceptual user interfaces, smart robotics, online advertising, learning and edutainment, and so forth. The recognized emotions can be classified into a number of different emotions, including but not limited to basic human emotions such as, angry, disgust, fear, happy, neutral, sad, and surprise.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
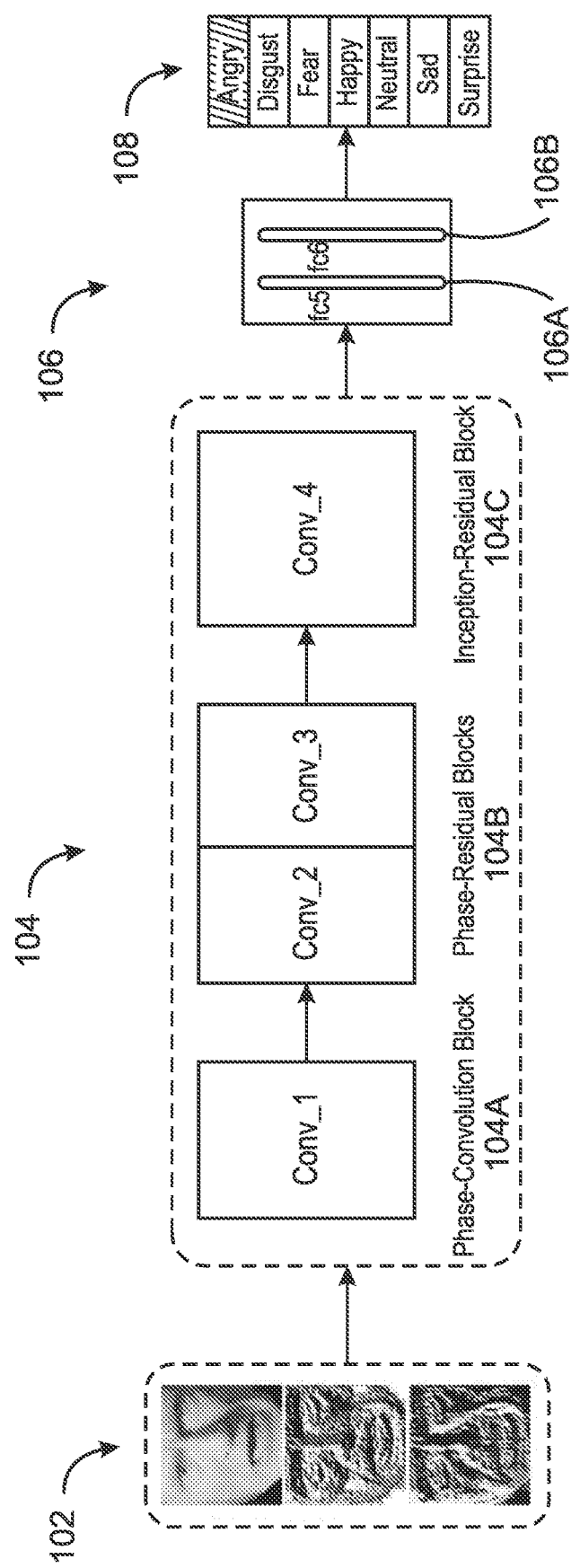
FIG. 1 is a block diagram of the present CNN that enables dynamic emotion recognition in unconstrained scenarios taking face images as input.

To detect and classify various human emotions with face images as input, deep learning techniques may be used. In particular, the present techniques employ a well-designed Convolutional Neural Networks (CNNs), to recognize and classify human emotions. Generally, a CNN can consist of a number of layers, from multiple to hundreds of layers. In most cases, a CNN is composed of two basic types of layers, namely convolutional layers and fully connected layers. The appealing merit of a CNN is that highly semantic features can be extracted through sequentially running CNN layers over the input image, and then emotion recognition can be performed on the final features obtained from the last fully connected layer of a CNN model. However, current top-performing CNNs for human emotion recognition are either not accurate enough or very time-consuming.

Embodiments described herein enable dynamic emotion recognition in unconstrained scenarios. The CNN architecture proposed herein is a deep yet computationally efficient CNN network for remarkably advancing emotion recognition in unconstrained scenarios. The robust emotion recognition as described herein includes a phase-convolution block for building the lower layers of the CNN, a phase-residual block for building the middle layers of the CNN, and an inception-residual block for building the top layers of the CNN. By grouping these three blocks into a single network, negative and positive phase information implicitly contained in the input data can flow though the CNN along multiple paths, resulting in the extraction of deep, highly-semantic, multi-scale features that explicitly capture variations in emotion. In embodiments, the extraction occurs along multi-path sibling layers of the CNN and the features are concatenated for robust recognition. Further, the present techniques can be applied in real-time.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a CNN 100 that enables dynamic emotion recognition in unconstrained scenarios. The CNN 100 includes a three-channel input 102, core layers 104, fully connected layers 106, and output labels 108. While a particular CNN structure is described herein, may different combinations of the proposed building blocks can generate different CNN architectures for meeting application requirements.

The three-channel input may be obtained at block 102 via a plurality of pre-processing steps. First, face localization/detection may be performed in a first frame of a video sequence. Face localization is performed on an arbitrary, unconstrained image to determine the location of the face that initially appears in a video. Determining the precise placement of the face determines the location of relevant information for processing by the CNN. Face localization/detection is followed by facial landmark point tracking. In facial landmark point tracking, a bounding box may be applied to the face and various features or landmarks of the face are determined and tracked. Landmarks are often a set of fiducial facial points, usually located on the corners, tips or mid points of the facial components such as the eyes, nose, lips and mouth. The landmarks may be determined by shape regression techniques such as Explicit Shape Regression (ESR) and Supervised Decent Method (SDM). Face frontalization comprises synthesizing frontal facing views of faces appearing in single unconstrained photos. During face frontalization, usually a 3D face model is adopted for registration and warping. Finally, illumination compensation enables dynamic emotion recognition in a variety of lighting conditions by compensating for and normalizing lighting conditions.

After data pre-processing, the gray-scale face image together with its corresponding basic Local Binary Patterns (LBP) and mean LBP feature maps are forwarded through the CNN as three-channel inputs. While particular feature maps have been described herein, any feature map can be used as input to the CNN 100.

The core layers block 104 incorporates three techniques for building lower, middle, and top layers of the CNN, resulting in a deep yet computationally efficient CNN. These techniques include a phase-convolution block 104A, phase-residual blocks 104B, and an inception-residual block 104C. The filters in the lower convolutional layers of the deep CNN 100 form pairs in phase. Thus, the filters of the lower convolutional layers contain considerable redundancy, and the number of filters can be reduced but the accuracy of the whole network is improved through modifying the activation scheme. To reduce redundant filters and enhance their non-saturated non-linearity in the lower convolutional layers, the phase-convolution block 104A is used for building lower layers of the CNN, such as a composite convolutional layer, denoted as conv_1 in FIG. 1.

The phase-residual blocks 104B are to employ a deep residual learning variant. The layers generated by the phase-residual blocks may learn residual functions with reference to the layer inputs, instead of learning unreferenced functions to create a residual network. The middle layers of the CNN 100 are built using this residual network, resulting in two composite convolutional layers, denoted as conv_2 and conv_3 in FIG. 1. The residual layers result in a considerably increased depth of the CNN while maintaining efficiency. Residual layers employ residual learning, wherein the layers are explicitly stacked to fit a residual mapping, instead of guessing that the layers will fit a desired underlying mapping. The convolutional layers of the phase residual blocks have mostly 3×3 filters and follow two simple design rules: (i) for the same output feature map size, the layers have the same number of filters; and (ii) if the feature map size is halved, the number of filters is doubled so as to preserve the time complexity per layer.

The inception-residual block 104C builds the top layers of the CNN 100, resulting in a composite convolutional layer, denoted as conv_4 in FIG. 1. The inception-residual block 104C broadens the network width and introduces multi-scale feature extraction property. The multi-scale feature extraction scheme results in a performance improvement in dynamic emotion recognition. Fully connected layers 106 may be used to abstract ($1^{st}$ fully connected layer) the features outputted by the layers block 104 and classify ($2^{nd}$ fully connected layer) abstracted features from $1^{st}$ fully connected layer according to the output labels 108. The output labels 108 represent a plurality of human emotions. The output labels 108 include, but are not limited to basic human emotions such as, angry, disgust, fear, happy, neutral, sad, and surprise.

The present techniques can be applied at a speed of over 3000 frames per second on a GPU, resulting in real-time processing. Redundant filters are reduced and their non-saturated non-linearity in the lower convolutional layers are enhanced via phase-convolution block to build lower layers. Accuracy is guaranteed by considerably increasing the depth of the CNN and maintaining efficiency via the phase-residual block to build the middle layers. The network width is also enhanced with multi-scale feature extraction via the inception-residual block used to build the topper layers of the CNN. In this manner, deep highly-semantic multi-scale features explicitly capturing emotion variation can be extracted from multi-path sibling layers and further concatenated for robust emotion recognition. The multi-scale feature map may comprise a plurality of features at different scales.

Figure 2:
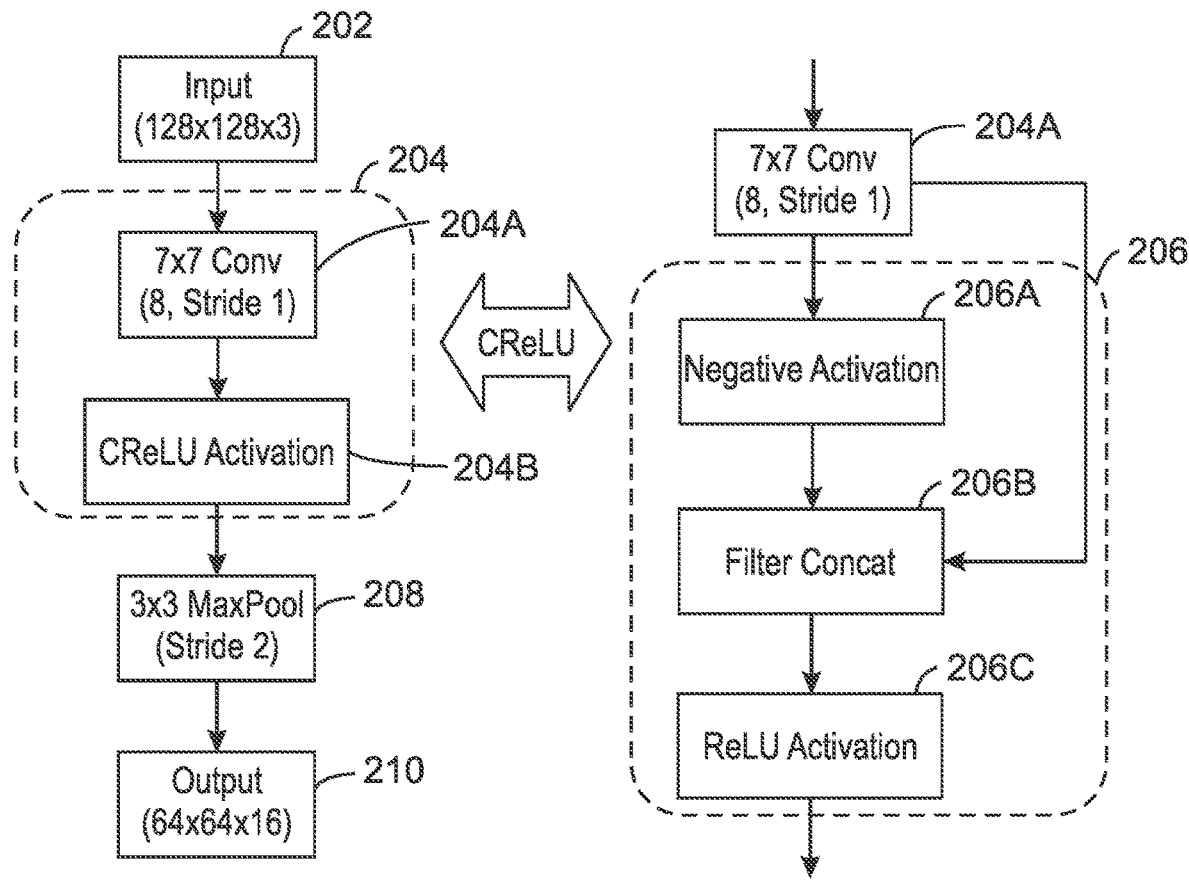
FIG. 2 is an illustration of a phase-convolution block.

FIG. 2 is an illustration of a phase-convolution block 200. The phase-convolution block 200 further describes the phase-convolution block 104A of FIG. 1. Given three-channel image inputs at block 202, a CNN as described herein begins with a phase-convolution. The size of the three-channel image input is 128×128×3, where the height of the image is 128 pixels, the width of the image is 128 pixels, and 3 is the number of channels. At block 204, convolution is performed. In particular, at block 204A eight filters of size 7×7 with a stride of 1 are convolved with the image to produce 16 feature maps of size 128×128. At block 204B, a Concatenated Rectified Linear Unit (CReLU) is applied at block 204B instead of basic a ReLU. A basic Rectified Linear Unit (ReLU) retains the phase information but eliminates the modulus information when the phase of a response is negative. The CReLU is further described at block 206.

At block 206, an identical copy (this is identity mapping) of the linear responses after convolution is made. First at block 206A, the convolution results are negated during negative activation. In embodiments, negative activation includes multiplying the output Y by −1. A ReLU operation preserves only positive output while making negative output to zero. Therefore, in the present CReLU, after concatenation, both original negative and positive outputs are made to be positive, so they are activated/preserved.

At block 206B, filter concatenation occurs, and at block 206C the ReLU is applied. In this manner, both the positive and negative phase information is preserved while learnable hyper-parameters can be reduced by half. The CReLU enables a mathematical characterization of convolution layers in terms of a reconstruction property, and preserves all image information after convolution. Thus, the corresponding CNN features are expressive and generalizable.

At block 208, each feature map is subsampled with max-pooling over 3×3 contiguous regions with a stride of 2.

In embodiments, max-pooling is used to aggregate statistics of discovered features at various locations. In particular, after max pooling with a stride of 2, a block 210 feature maps of size 64×64×16 are output.

Figure 3:
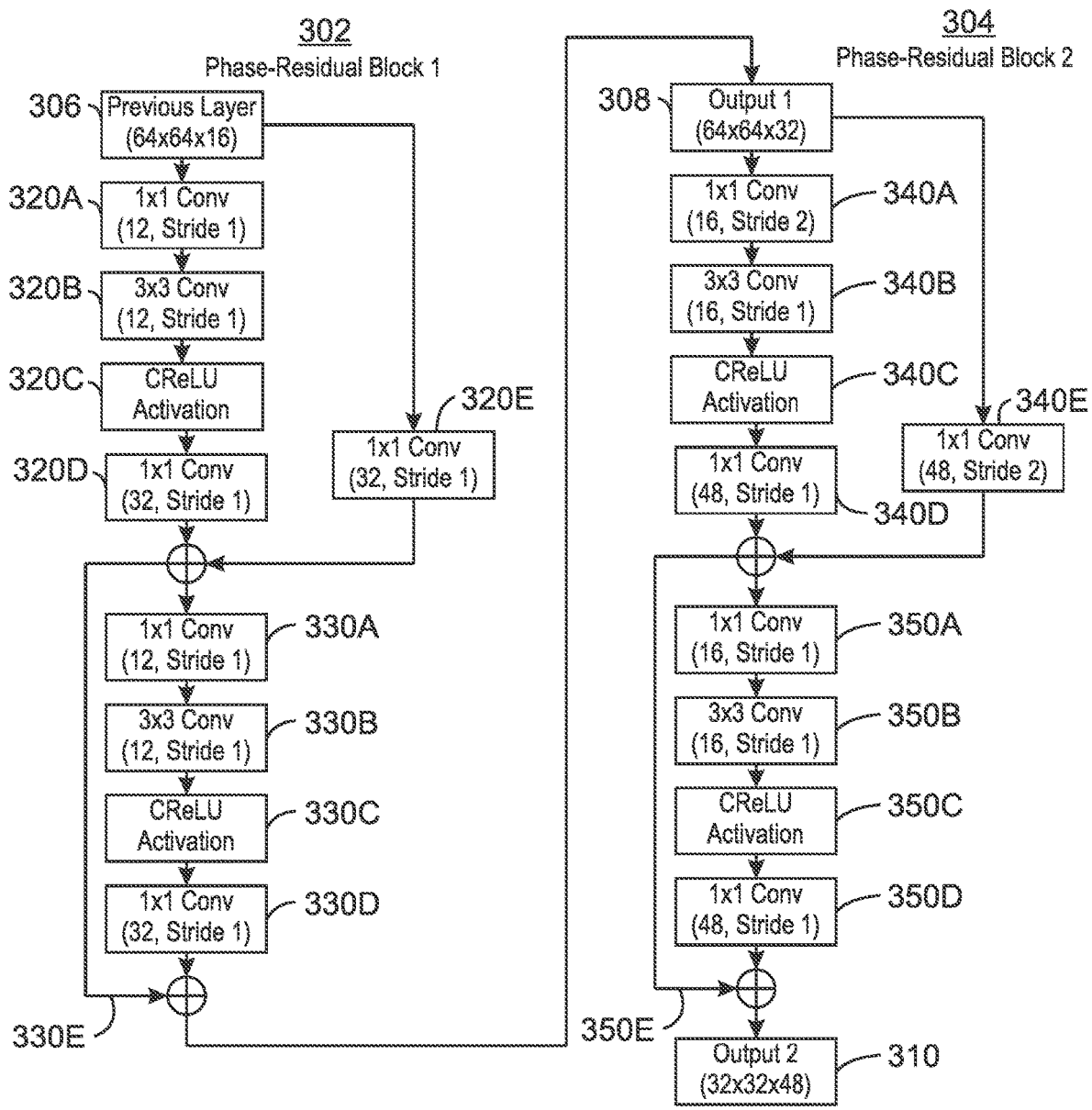
FIG. 3 is an illustration of phase-residual blocks.

FIG. 3 is an illustration of phase-residual blocks 300. The phase-residual blocks 300 may be used to describe the phase-residual blocks 104B of FIG. 1. Following the conv_1 during the phase-convolution block 104A, there are two composite convolutional layers conv_2 and conv_3 during the phase-residual blocks 104B. They are defined as two phase-residual blocks 302 and 304 shown as the left and right parts of FIG. 3. In each phase-residual block 302 and 304, the CReLU and residual structure are combined into each of two sub-blocks. Each sub-block is composed of three convolutional layers (with 1×1, 3×3 and 1×1 kernels) with a stride of 1. Following the 3×3 convolutional layer, a CReLU operation, which compensates face feature and reduces redundancy. The last step in each sub-block such as 320E and 330D, 330D, 340E and 340D, and 350D, are a residual operations.

In particular, at block 306, the feature maps from the phase-inception block 200 are obtained as input. At block 320A, a first convolutional layer convolves a 1×1 set of 12 kernels with the input from block 306. At block 320B, a second convolutional layer convolves a 3×3 set of 12 kernels with the input from block 320A. At block 320C, CReLU activation is performed on the output of block 320B. At block 320D, a third convolutional layer convolves a 1×1 set of 32 kernels with the input from block 320C. At block 320E, a convolutional layer convolves a 1×1 set of 32 kernels with the input from block 306. The output from block 320D and 320E (this is one residual operation using shortcut connection) are summed element-wise and input to block 330A, where a first convolutional layer convolves a 1×1 set of 12 kernels with the summed input from blocks 320D and 320E. At block 330B, a second convolutional layer convolves a 3×3 set of 12 kernels with the input from block 330A. At block 330C, CReLU activation is performed on the output of block 330B. At block 330D, a third convolutional layer convolves a 1×1 set of 32 kernels with the input from block 330C. The output of block 330D is summed element-wise with the output of blocks 320D and 320E, represented by block 330E (this is another residual operation using identity mapping), which results in 32 feature maps of size 64×64.

This output serves as an input at block 308 in the phase-residual block 2. Similar to the phase-residual block 302, at block 340A, a first convolutional layer convolves a 1×1 set of 16 kernels with the input from block 308. At block 340B, a second convolutional layer convolves a 3×3 set of 16 kernels with the input from block 340A. At block 340C, CReLU activation is performed on the output of block 340B. At block 340D, a third convolutional layer convolves a 1×1 set of 48 kernels with the input from block 340C. At block 340E, a convolutional layer convolves a 1×1 set of 48 kernels with the input from block 308. The output from block 340D and 340E are summed element-wise (this is one residual operation using shortcut connection) and input to block 350A, where a first convolutional layer convolves a 1×1 set of 16 kernel with the summed input from blocks 340D and 340E. At block 350B, a second convolutional layer convolves a 3×3 set of 16 kernel with the input from block 350A. At block 350C, CReLU activation is performed on the output of block 350B. At block 350D, a third convolutional layer convolves a 1×1 set of 48 kernel with the input from block 350C. The output of block 350D is summed element wise with the output of blocks 340D and 340E, represented by block 350E (this is another residual operation using identity mapping), which results in 48 feature maps of size 32×32.

Linear projection (i.e., a shortcut connection) is performed at the first sub-block in 302, while identity mapping is performed at the second sub-block in 304. In embodiments, identity mapping refers to directly copying the output, while the shortcut connection comprises applying a specific convolution over the output. Shortcut connections are those that skip one or more layers. Shortcut connections may perform identity mapping, and their outputs are added to the outputs of the stacked layer. Identity shortcut connections add neither extra parameters nor computational complexity.

The advantages of above defined phase-residual block 300 are twofold. First, the phase-residual block 300 enjoys fast training convergence. Second, the phase-residual block 300 enjoys the accuracy gain from considerably increased depth and maintain efficiency. In embodiments, phase-residual blocks contain many of sub-layers (i.e., convolutional layers), resulting in a much deeper network, especially compared with a phase-convolutional block.

Figure 4:
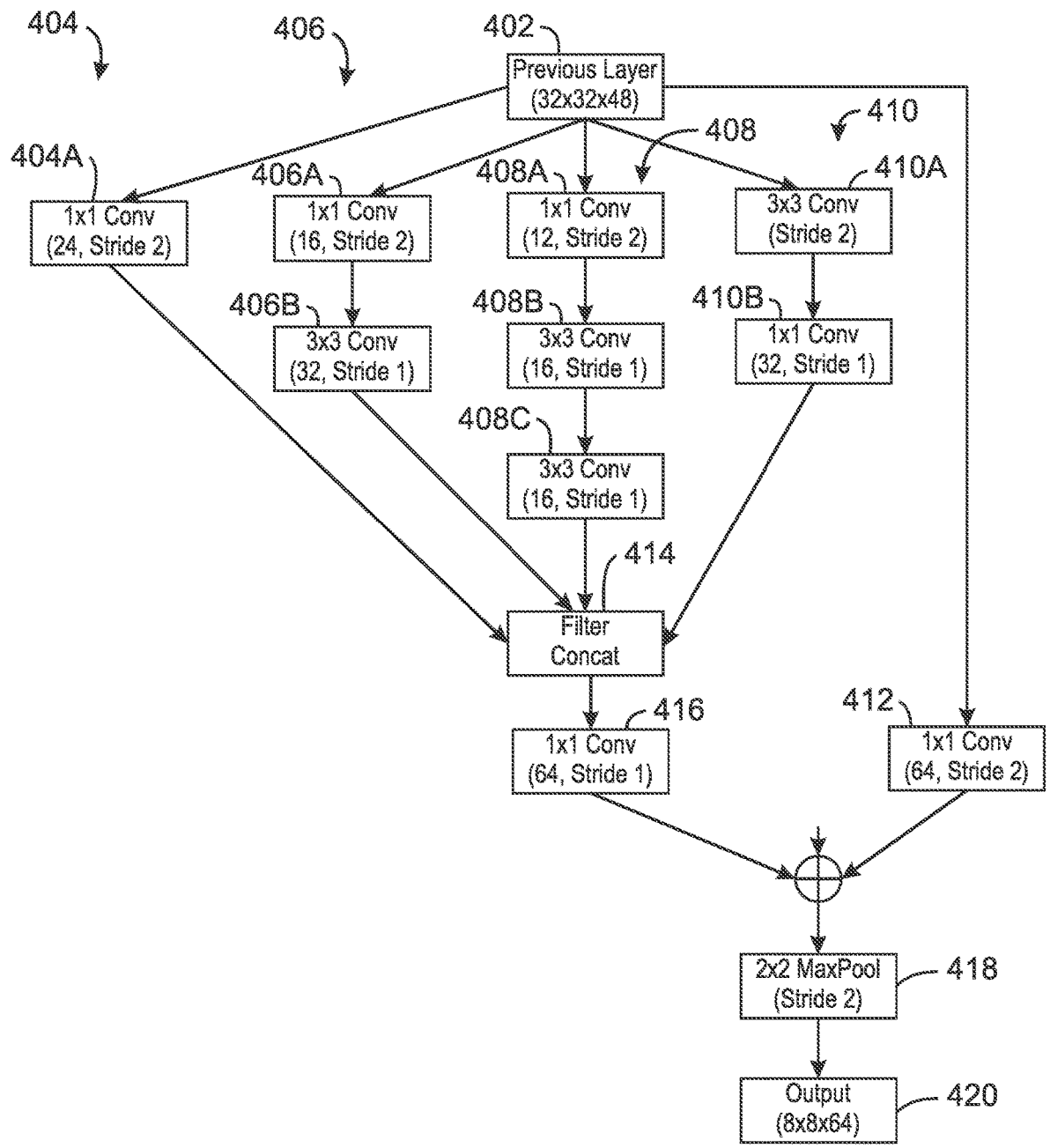
FIG. 4 is an illustration of an inception-residual block.

FIG. 4 is an illustration of an inception-residual block 400. At block 402, the input to the inception-residual block 400 is the output of the phase-residual block with 48 feature maps of size 32×32. The inception-residual block 400 may be the inception-residual block 104C of FIG. 1. The inception-residual block 400 begins with four sibling branches 404, 406, 408, and 410, each acting as a multi-scale feature extraction.

The most left sibling branch 404 includes a block 404A, where the input is convolved with a 1×1 set of 24 convolutional layers with stride of 2, akin to a 1×1 filter. The neighboring sibling branch 406 has a 1×1 set of 16 convolutional layers with stride 2 at block 406A and a 3×3 set of 32 convolutional layers at block 406B, akin to a 3×3 filter. The other two sibling branches are similar to branches 404 and 406. Specifically, branch 408 has a 1×1 set of 12 convolutional layers with stride of 2 at block 408A, a 3×3 set of 16 convolutional layers at block 408B, and a 3×3 set of 16 convolutional layers at block 408C, akin to a 3×3 filter. Branch 410 has a maxpool layer with stride of 2 at block 410A, and a 1×1 set of 32 convolutional layers at block 410B.

A multi-scale feature map is yielded by concatenating the feature maps from above four sibling branches at block 414. In embodiments, the multi-scale feature map is the result of the four sibling layers acting as convolutions with different filter sizes in spatial, i.e., different reception fields for sibling layers. At block 416, the concatenated feature maps are convolved by a 1×1 set of 64 convolutional layers and summed element wise (this is a residual operation with a shortcut connection) with a 1×1 set of 64 convolutional layers applied to the input data from block 412. At block 418, the summed layers are subsampled by a 2×2 maxpooling operation with a stride of 2. This results in an output of 64 8×8 feature maps at block 420.

Empirical evidence shows that inception with residual connections accelerates the training significantly. One the other hand, high dimensional features extracted from multi-scale image patches can lead to high accuracy. The inception-residual block combines these two properties together with a residual structure. The advantages of above defined inception-residual block 400 can extract more discriminative features at multiple scales, e.g., from micro to macro scale, thus bringing improved accuracy. Additionally, the inception-residual block 400 results in fast training convergence, and also results in an accuracy gain from considerably increased depth of the network. Further, even with a deep network, efficiency is maintained.

Following the inception-residual block 104C, there are two fully connected layers fc5 106A and fc6 1068 at block 106 in FIG. 1. Final feature abstraction is performed by fc5 106A whose output feature size is 1024, and fc6 1068 is a classification layer with a softmax function outputting a plurality of human emotions, such as 7 basic human emotions including angry, disgust, fear, happy, neutral, sad, and surprise.

The CNN as described herein has fewer convolutional filters and thus a much lower computational cost with a similar depth when compared to other popular deep CNNs for computer vision tasks not just limited to dynamic emotion recognition in unconstrained scenarios. Generally, the CNN described herein includes 21-layers and 75 million floating point operations per second FLOPs. The FLOPs according to the present techniques are a small when compared to other deep CNNs. Thus, the present CNN model can be well run on any mobile platform with real-time processing requirement. A brief summary of FLOPs for the present CNN architecture model is given in Table 1.

| Layer Name | Output Size (before MaxPool) | FLOPs (million) |
|---|---|---|
| conv_1 | 128 × 128 | 19.27 |
| conv_2 | 64 × 64 | 22.22 |
| conv_3 | 32 × 32 | 10.85 |
| conv_4 | 16 × 16 | 5.86 |
| fc5 | 1024 | 16.79 |
| fc6 | 7 | 0.01 |
| Total | | 75.00 |

Figure 5:
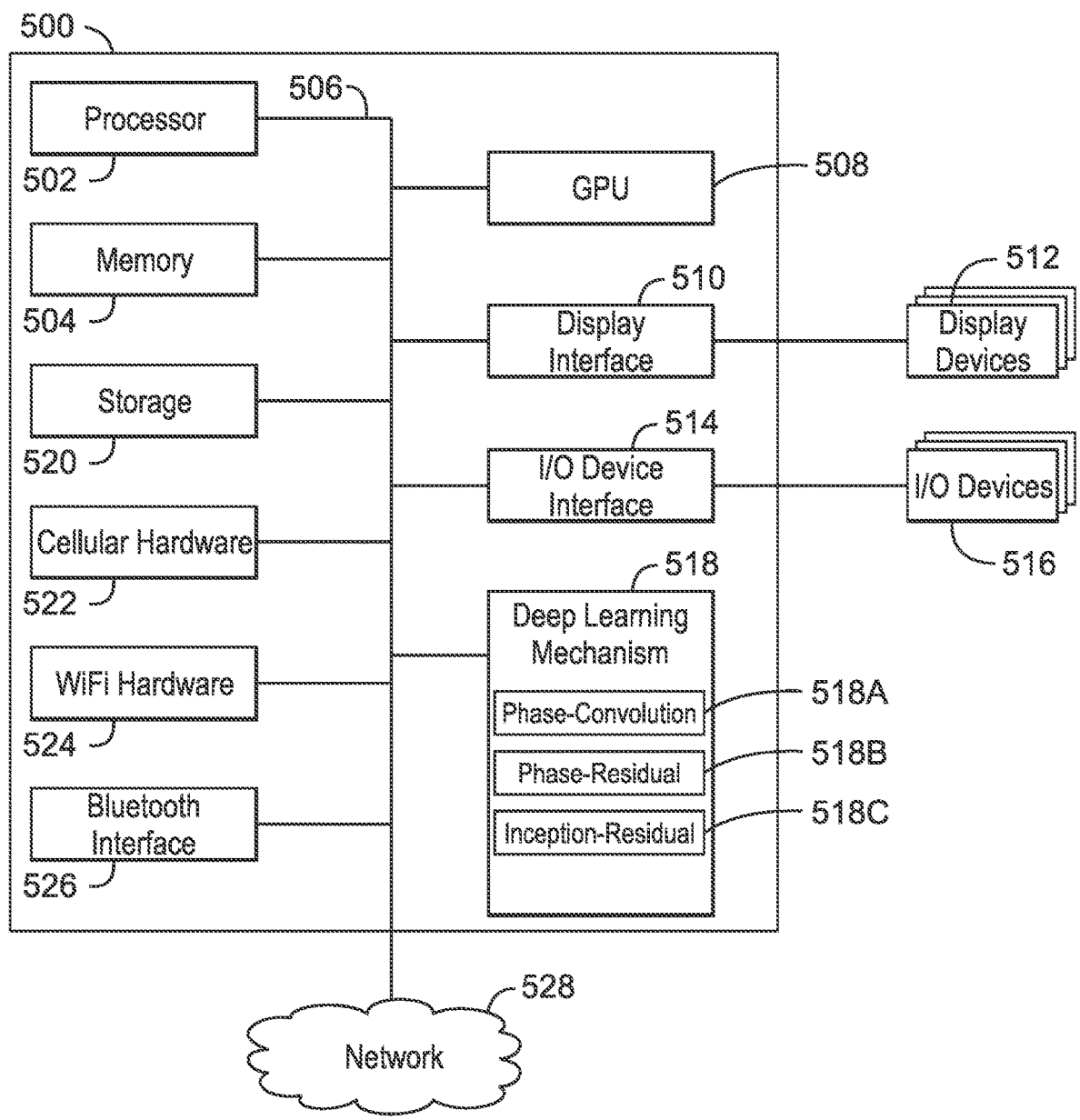
FIG. 5 is a block diagram of an electronic device that enables dynamic emotion recognition in unconstrained scenarios.

FIG. 5 is a block diagram of an electronic device that enables dynamic emotion recognition in unconstrained scenarios. The electronic device 500 may be, for example, a laptop computer, tablet computer, mobile phone, smart phone, or a wearable device, among others. The electronic device 500 may include a central processing unit (CPU) 502 that is configured to execute stored instructions, as well as a memory device 504 that stores instructions that are executable by the CPU 502. The CPU may be coupled to the memory device 504 by a bus 506. Additionally, the CPU 502 can be a single core processor, a multi-core processor, a computing cluster, or any number of other configurations. Furthermore, the electronic device 500 may include more than one CPU 502. The memory device 504 can include random access memory (RAM), read only memory (ROM), flash memory, or any other suitable memory systems. For example, the memory device 504 may include dynamic random access memory (DRAM).

The electronic device 500 also includes a graphics processing unit (GPU) 508. As shown, the CPU 502 can be coupled through the bus 506 to the GPU 508. The GPU 508 can be configured to perform any number of graphics operations within the electronic device 500. For example, the GPU 508 can be configured to render or manipulate graphics images, graphics frames, videos, or the like, to be displayed to a user of the electronic device 500. In some embodiments, the GPU 508 includes a number of graphics engines, wherein each graphics engine is configured to perform specific graphics tasks, or to execute specific types of workloads.

The CPU 502 can be linked through the bus 506 to a display interface 510 configured to connect the electronic device 500 to a display device 522. The display device 522 can include a display screen that is a built-in component of the electronic device 500. The display device 522 can also include a computer monitor, television, or projector, among others, that is externally connected to the electronic device 500.

The CPU 502 can also be connected through the bus 506 to an input/output (I/O) device interface 514 configured to connect the electronic device 500 to one or more I/O devices 516. The I/O devices 516 can include, for example, a keyboard and a pointing device, wherein the pointing device can include a touchpad or a touchscreen, among others. The I/O devices 516 can be built-in components of the electronic device 500, or can be devices that are externally connected to the electronic device 500.

Accordingly, the electronic device 500 also includes a deep learning mechanism 518 for capturing face images/videos. The deep learning mechanism 518 builds a Convolutional Neural Network (CNN) via a phase-convolution block 518A, phase-residual blocks 518B, and an inception-residual block 518C.

The storage device 520 is a physical memory such as a hard drive, an optical drive, a flash drive, an array of drives, or any combinations thereof. The storage device 520 can store user data, such as audio files, video files, audio/video files, and picture files, among others. The storage device 520 can also store programming code such as device drivers, software applications, operating systems, and the like. The programming code stored to the storage device 520 may be executed by the CPU 502, GPU 508, or any other processors that may be included in the electronic device 500.

The CPU 502 may be linked through the bus 506 to cellular hardware 522. The cellular hardware 522 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 500 may access any network 524 without being tethered or paired to another device, where the network 528 is a cellular network.

The CPU 502 may also be linked through the bus 506 to WiFi hardware 524. The WiFi hardware is hardware according to WiFi standards (standards promulgated as Institute of Electrical and Electronics Engineers' (IEEE) 802.11 standards). The WiFi hardware 524 enables the wearable electronic device 500 to connect to the Internet using the Transmission Control Protocol and the Internet Protocol (TCP/IP), where the network 528 is the Internet. Accordingly, the wearable electronic device 500 can enable end-to-end connectivity with the Internet by addressing, routing, transmitting, and receiving data according to the TCP/IP protocol without the use of another device. Additionally, a Bluetooth Interface 526 may be coupled to the CPU 502 through the bus 506. The Bluetooth Interface 526 is an interface according to Bluetooth networks (based on the Bluetooth standard promulgated by the Bluetooth Special Interest Group). The Bluetooth Interface 526 enables the wearable electronic device 500 to be paired with other Bluetooth enabled devices through a personal area network (PAN). Accordingly, the network 528 may be a PAN. Examples of Bluetooth enabled devices include a laptop computer, desktop computer, ultrabook, tablet computer, mobile device, or server, among others.

The block diagram of FIG. 5 is not intended to indicate that the electronic device 500 is to include all of the components shown in FIG. 5. Rather, the computing system 500 can include fewer or additional components not illustrated in FIG. 5 (e.g., sensors, power management integrated circuits, additional network interfaces, etc.). The electronic device 500 may include any number of additional components not shown in FIG. 5, depending on the details of the specific implementation. Furthermore, any of the functionalities of the CPU 502 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 6:
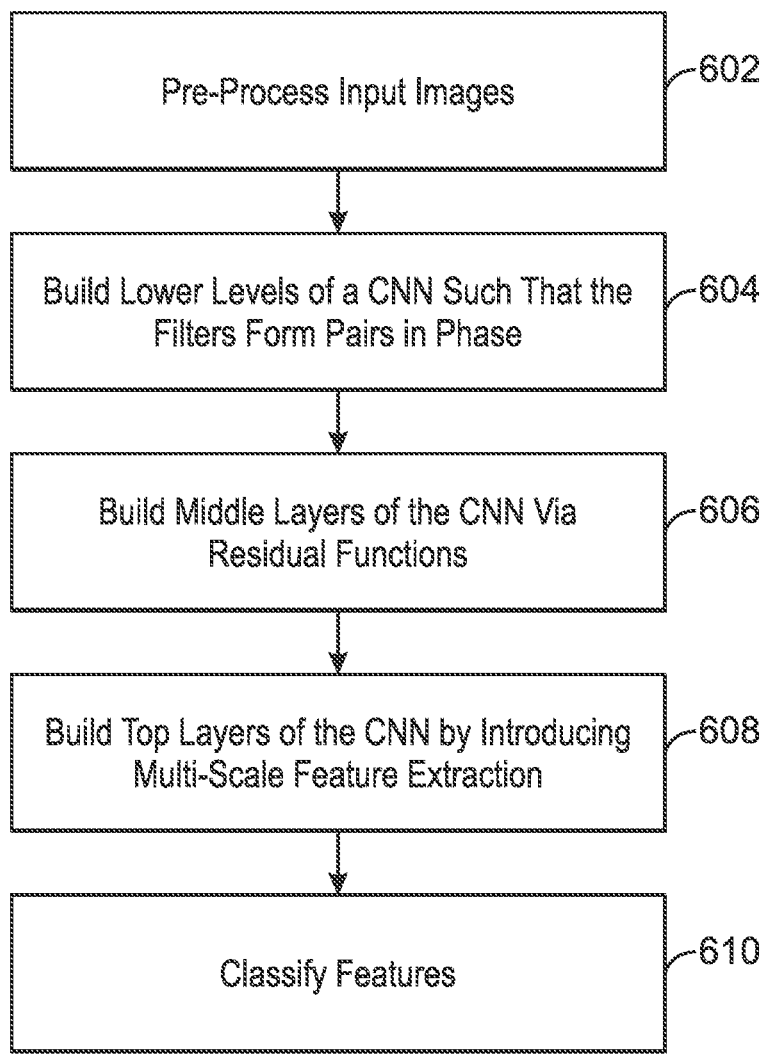
FIG. 6 is a process flow diagram of a method for dynamic motion recognition in unconstrained scenarios.

FIG. 6 is a process flow diagram of a method 600 for dynamic motion recognition in unconstrained scenarios. At block 602, input images are pre-processed. At block 604, the lower levels of a present CNN are built such that the filters of the CNN form pairs in phase. The lower levels of the CNN may be built using a phase-convolution block. At block 606, the middle layers of the CNN may be built via a plurality of residual functions. In embodiments, the middle layers may be built using two phase-residual blocks. At block 608, the top layers of the CNN may be built by introducing multi-scale feature extraction. In embodiment, the top layers of the CNN may be built via an inception-residual block. At block 610, the extracted features are classified. In embodiments, the extracted features may be classified by at least one fully connected layer of the CNN. The classification may be a probability distribution that indicates the likelihoods that an emotion shown in the video or frame belongs to a particular set of output labels.

Figure 7:
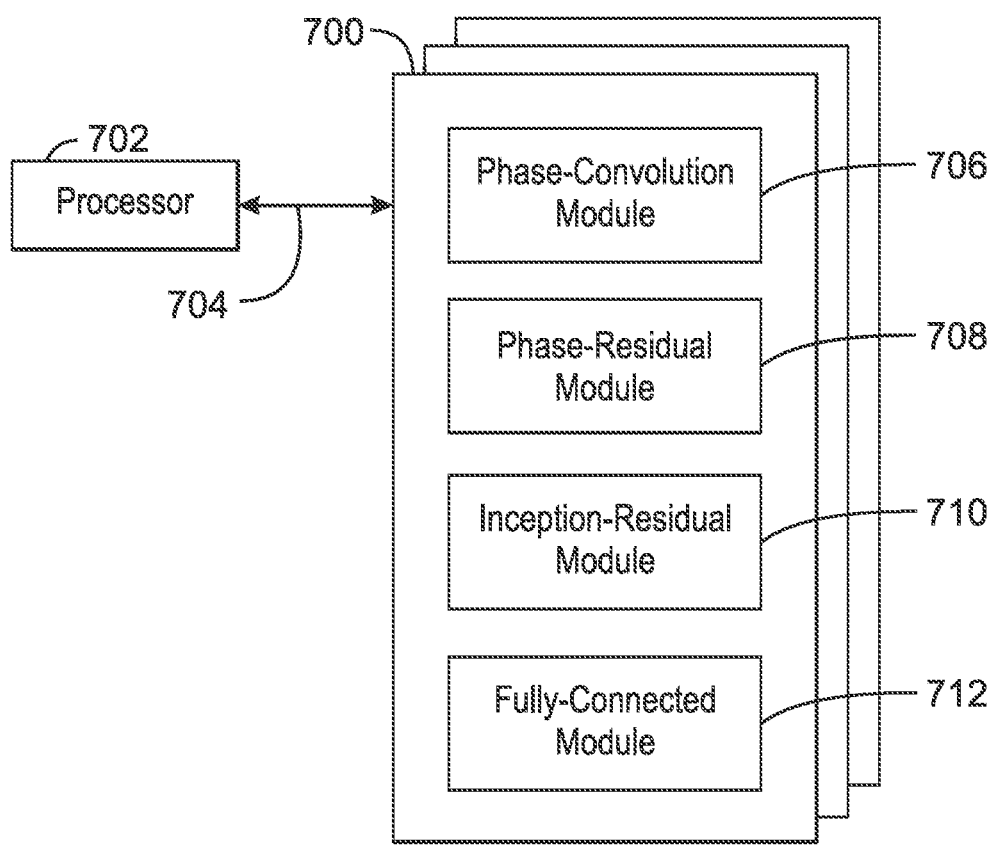
FIG. 7 is a block diagram showing a medium 700 that contains logic for dynamic motion recognition in unconstrained scenarios.

FIG. 7 is a block diagram showing a medium 700 that contains logic for dynamic motion recognition in unconstrained scenarios. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-712 configured to perform the techniques described herein. For example, a phase-convolution module 706 may be configured to build lower levels of the present CNN such that the filters form pairs in phase. A phase-residual module 708 may be configured to build middle layers of the CNN via plurality of residual functions. An inception-residual module 710 may be configured to be configured to build top layers of the CNN by introducing multi-scale feature extraction. A fully connected module 712 may be configured to perform feature abstraction and final emotion recognition.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Example 1 is an apparatus for dynamic emotion recognition in unconstrained scenarios. The apparatus includes a controller to pre-process image data; a phase-convolution mechanism to build lower layers of a CNN, wherein the layers comprise a plurality of filters and filters of the lower layers form pairs in phase; a phase-residual mechanism to build middle layers of the CNN via a plurality of residual functions; an inception-residual mechanism to build top layers of the CNN via multi-scale feature extraction; and a fully connected mechanism to perform feature abstraction and final emotion recognition.

Example 2 includes the apparatus of example 1, including or excluding optional features. In this example, the phase-convolution mechanism convolves the pre-processed image data and applies a Concatenated Rectified Linear Unit (CReLU) to the pre-processed image data. Optionally, the Concatenated Rectified Linear Unit (CReLU) copies a plurality of linear responses after convolution, negates the linear responses, concatenates both parts of an activation, and applies a rectified linear unit (ReLU) to the pre-processed image data. Optionally, the Concatenated Rectified Linear Unit (CReLU) maintains positive and negative phase information for a plurality of features by mathematically characterizing the convolutional layers in terms of a reconstruction property.

Example 3 includes the apparatus of any one of examples 1 to 2, including or excluding optional features. In this example, the phase-residual mechanism is to reduce redundancy in the plurality of filters of the CNN.

Example 4 includes the apparatus of any one of examples 1 to 3, including or excluding optional features. In this example, the phase-residual mechanism is to increase the depth of the CNN by stacking specifically designed composite layers.

Example 5 includes the apparatus of any one of examples 1 to 4, including or excluding optional features. In this example, the phase-residual mechanism applies a linear projection, identity shortcut connection, and a Concatenated Rectified Linear Unit (CReLU) to data from the phase-convolution mechanism.

Example 6 includes the apparatus of any one of examples 1 to 5, including or excluding optional features. In this example, the inception-residual mechanism generates a multi-scale feature map.

Example 7 includes the apparatus of any one of examples 1 to 6, including or excluding optional features. In this example, the fully connected mechanism comprises a first fully connected layer that is to perform the feature abstraction and a second fully connected layer that is to classify a plurality of final features.

Example 8 includes the apparatus of any one of examples 1 to 7, including or excluding optional features. In this example, the CNN classifies a plurality of features in real-time.

Example 9 is a method for dynamic emotion recognition in unconstrained scenarios. The method includes pre-processing image data; building a plurality of lower levels of a CNN using the image data wherein filters of the lower levels form pairs in phase; building a plurality of middle layers of the CNN via a plurality of residual functions; building a plurality of top layers of the CNN via multi-scale feature extraction that is to extract a plurality of features; and classifying the extracted plurality of features.

Example 10 includes the method of example 9, including or excluding optional features. In this example, building the lower levels of the CNN comprises: generating an identical copy of a plurality of linear responses after convolution; negating results of the convolution; applying a Concatenated Rectified Linear Unit (CReLU); and max-pooling to determine a number of feature maps. Optionally, the Concatenated Rectified Linear Unit (CReLU) copies a plurality of linear responses after convolution, negates the linear responses, concatenates both parts of the activation, and applies a rectified linear unit (ReLU). Optionally, the Concatenated Rectified Linear Unit (CReLU) maintains positive and negative phase information for a plurality of features by mathematically characterizing the convolutional layers in terms of a reconstruction property.

Example 11 includes the method of any one of examples 9 to 10, including or excluding optional features. In this example, building the plurality of middle layers of the CNN comprises reducing redundancy in filters of the CNN via residual functions with reference to the inputs to the middle layers.

Example 12 includes the method of any one of examples 9 to 11, including or excluding optional features. In this example, the building the plurality of middle layers of the CNN is to increase a depth of the CNN by stacking composite layers specifically designed to fit a residual mapping.

Example 13 includes the method of any one of examples 9 to 12, including or excluding optional features. In this example, the building the plurality of middle layers of the CNN results in a same number of filters for a same output feature map size, and in response to the feature map size being halved, the number of filters is doubled.

Example 14 includes the method of any one of examples 9 to 13, including or excluding optional features. In this example, building the top layers of the CNN comprises an inception-residual block that generates a multi-scale feature map comprising a plurality of features at different scales.

Example 15 includes the method of any one of examples 9 to 14, including or excluding optional features. In this example, a fully connected mechanism comprises a first fully connected layer that is to perform a final feature abstraction and a second fully connected layer that is to classify the final features.

Example 16 includes the method of any one of examples 9 to 15, including or excluding optional features. In this example, the CNN classifies extraction features in real-time.

Example 17 is a system for dynamic emotion recognition in unconstrained scenarios. The system includes a three-channel input comprising a gray-scale face image, a corresponding basic Local Binary Patterns (LBP), and mean LBP feature maps; a memory that is to store instructions and the three channel input; and a processor communicatively coupled to the memory, wherein when the processor is to execute the instructions, the processor is to: building a plurality of lower levels of a CNN using the three channel input, wherein filters of the lower levels form pairs in phase; building a plurality of middle layers of the CNN via a plurality of residual functions; building a plurality of top layers of the CNN via multi-scale feature extraction that is to extract a plurality of features; and classifying the extracted plurality of features.

Example 18 includes the system of example 17, including or excluding optional features. In this example, building the lower levels of the CNN comprises: generating an identical copy of a plurality of linear responses after convolution; negating results of the convolution; applying a Concatenated Rectified Linear Unit (CReLU); and max-pooling to determine a number of feature maps. Optionally, the Concatenated Rectified Linear Unit (CReLU) copies a plurality of linear responses after convolution, negates the linear responses, concatenates both parts of the activation, and applies a rectified linear unit (ReLU). Optionally, the Concatenated Rectified Linear Unit (CReLU) maintains positive and negative phase information for a plurality of features by mathematically characterizing the convolutional layers in terms of a reconstruction property.

Example 19 includes the system of any one of examples 17 to 18, including or excluding optional features. In this example, building the plurality of middle layers of the CNN comprises reducing redundancy in filters of the CNN via residual functions with reference to the inputs to the middle layers.

Example 20 includes the system of any one of examples 17 to 19, including or excluding optional features. In this example, the building the plurality of middle layers of the CNN is to increase a depth of the CNN by stacking composite layers specifically designed to fit a residual mapping.

Example 21 includes the system of any one of examples 17 to 20, including or excluding optional features. In this example, the building the plurality of middle layers of the CNN results in a same number of filters for a same output feature map size, and in response to the feature map size being halved, the number of filters is doubled.

Example 22 includes the system of any one of examples 17 to 21, including or excluding optional features. In this example, building the top layers of the CNN comprises generating a multi-scale feature map comprising a plurality of features at different scales.

Example 23 includes the system of any one of examples 17 to 22, including or excluding optional features. In this example, a fully connected mechanism comprises a first fully connected layer that is to perform a final feature abstraction and a second fully connected layer that is to classify the final features.

Example 24 includes the system of any one of examples 17 to 23, including or excluding optional features. In this example, the multi-scale feature extraction increases a width of the CNN.

Example 25 is a tangible, non-transitory, computer-readable medium. The computer-readable medium includes instructions that direct the processor to pre-process image data; build a plurality of lower levels of a CNN using the image data wherein filters of the lower levels form pairs in phase; build a plurality of middle layers of the CNN via a plurality of residual functions; build a plurality of top layers of the CNN via multi-scale feature extraction that is to extract a plurality of features; and classify the extracted plurality of features.

Example 26 includes the computer-readable medium of example 25, including or excluding optional features. In this example, building the lower levels of the CNN comprises: generating an identical copy of a plurality of linear responses after convolution; negating results of the convolution; applying a Concatenated Rectified Linear Unit (CReLU); and max-pooling to determine a number of feature maps. Optionally, the Concatenated Rectified Linear Unit (CReLU) copies a plurality of linear responses after convolution, negates the linear responses, concatenates both parts of the activation, and applies a rectified linear unit (ReLU). Optionally, the Concatenated Rectified Linear Unit (CReLU) maintains positive and negative phase information for a plurality of features by mathematically characterizing the convolutional layers in terms of a reconstruction property.

Example 27 includes the computer-readable medium of any one of examples 25 to 26, including or excluding optional features. In this example, building the plurality of middle layers of the CNN comprises reducing redundancy in filters of the CNN via residual functions with reference to the inputs to the middle layers.

Example 28 includes the computer-readable medium of any one of examples 25 to 27, including or excluding optional features. In this example, the building the plurality of middle layers of the CNN is to increase a depth of the CNN by stacking composite layers specifically designed to fit a residual mapping.

Example 29 includes the computer-readable medium of any one of examples 25 to 28, including or excluding optional features. In this example, the building the plurality of middle layers of the CNN results in a same number of filters for a same output feature map size, and in response to the feature map size being halved, the number of filters is doubled.

Example 30 includes the computer-readable medium of any one of examples 25 to 29, including or excluding optional features. In this example, building the top layers of the CNN comprises an inception-residual block that generates a multi-scale feature map comprising a plurality of features at different scales.

Example 31 includes the computer-readable medium of any one of examples 25 to 30, including or excluding optional features. In this example, a fully connected mechanism comprises a first fully connected layer that is to perform a final feature abstraction and a second fully connected layer that is to classify the final features.

Example 32 includes the computer-readable medium of any one of examples 25 to 31, including or excluding optional features. In this example, the CNN classifies extraction features in real-time.

Example 33 is an apparatus for dynamic emotion recognition in unconstrained scenarios. The apparatus includes instructions that direct the processor to a controller to pre-process image data; a means to build lower layers of a CNN, wherein the layers comprise a plurality of filters and filters of the lower layers form pairs in phase; a means to build middle layers of the CNN via a plurality of residual functions; a means to build top layers of the CNN via multi-scale feature extraction; and a fully connected mechanism to perform feature abstraction and final emotion recognition.

Example 34 includes the apparatus of example 33, including or excluding optional features. In this example, the means to build lower layers of the CNN convolves the pre-processed image data and applies a Concatenated Rectified Linear Unit (CReLU) to the pre-processed image data. Optionally, the Concatenated Rectified Linear Unit (CReLU) copies a plurality of linear responses after convolution, negates the linear responses, concatenates both parts of an activation, and applies a rectified linear unit (ReLU) to the pre-processed image data. Optionally, the Concatenated Rectified Linear Unit (CReLU) maintains positive and negative phase information for a plurality of features by mathematically characterizing the convolutional layers in terms of a reconstruction property.

Example 35 includes the apparatus of any one of examples 33 to 34, including or excluding optional features. In this example, means to build middle layers of the CNN is to reduce redundancy in the plurality of filters of the CNN.

Example 36 includes the apparatus of any one of examples 33 to 35, including or excluding optional features. In this example, means to build middle layers of the CNN is to increase the depth of the CNN by stacking specifically designed composite layers.

Example 37 includes the apparatus of any one of examples 33 to 36, including or excluding optional features. In this example, means to build middle layers of the CNN applies a linear projection, identity shortcut connection, and a Concatenated Rectified Linear Unit (CReLU) to data from the means to build lower layers of the CNN.

Example 38 includes the apparatus of any one of examples 33 to 37, including or excluding optional features. In this example, means to build top layers of the CNN generates a multi-scale feature map.

Example 39 includes the apparatus of any one of examples 33 to 38, including or excluding optional features. In this example, the fully connected mechanism comprises a first fully connected layer that is to perform the feature abstraction and a second fully connected layer that is to classify a plurality of final features.

Example 40 includes the apparatus of any one of examples 33 to 39, including or excluding optional features. In this example, the CNN classifies a plurality of features in real-time.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for dynamic emotion recognition in unconstrained scenarios, the apparatus comprising:
   a controller to pre-process image data;
   a phase-convolution mechanism to build lower layers of a CNN, wherein the layers include a plurality of filters and filters of the lower layers form pairs in phase;
   a phase-residual mechanism to build middle layers of the CNN via a plurality of residual functions;
   an inception-residual mechanism to build top layers of the CNN via multi-scale feature extraction; and
   a fully connected mechanism to perform feature abstraction and final emotion recognition.

2. The apparatus of claim 1, wherein the phase-convolution mechanism is to convolve the pre-processed image data and apply a Concatenated Rectified Linear Unit (CReLU) to the pre-processed image data.

3. The apparatus of claim 1, wherein the phase-residual mechanism is to reduce redundancy in the plurality of filters of the CNN.

4. The apparatus of claim 1, wherein the phase-residual mechanism is to increase the depth of the CNN by stacking specifically designed composite layers.

5. The apparatus of claim 1, wherein the phase-residual mechanism is to apply a linear projection, identity shortcut connection, and a Concatenated Rectified Linear Unit (CReLU) to data from the phase-convolution mechanism.

6. The apparatus of claim 1, wherein the inception-residual mechanism is to generate a multi-scale feature map.

7. The apparatus of claim 1, wherein the fully connected mechanism includes a first fully connected layer that is to perform the feature abstraction and a second fully connected layer that is to classify a plurality of final features.

8. The apparatus of claim 1, wherein the CNN is to classify a plurality of features in real-time.

9. A method for dynamic emotion recognition in unconstrained scenarios, the method comprising:
   pre-processing image data;

building a plurality of lower levels of a CNN using the image data wherein filters of the lower levels form pairs in phase via a Concatenated Rectified Linear Unit (CReLU);

building a plurality of middle layers of the CNN via a plurality of residual functions;

building a plurality of top layers of the CNN via multi-scale feature extraction that is to extract a plurality of features; and classifying the extracted plurality of features.

10. The method of claim 9, wherein building the lower levels of the CNN includes:

generating an identical copy of a plurality of linear responses after convolution;

negating results of the convolution;

applying the Concatenated Rectified Linear Unit (CReLU); and max-pooling to determine a number of feature maps.

11. The method of claim 9, wherein applying the Concatenated Rectified Linear Unit (CReLU) includes:

copying a plurality of linear responses after convolution;

negating the linear responses;

concatenating both parts of the activation; and applying a rectified linear unit (ReLU).

12. The method of claim 9, wherein applying the Concatenated Rectified Linear Unit (CReLU) includes maintaining positive and negative phase information for a plurality of features by mathematically characterizing the convolutional layers in terms of a reconstruction property.

13. The method of claim 9, wherein building the plurality of middle layers of the CNN includes reducing redundancy in filters of the CNN via residual functions with reference to the inputs to the middle layers.

14. The method of claim 9, wherein the building the plurality of middle layers of the CNN is to increase a depth of the CNN by stacking composite layers specifically designed to fit a residual mapping.

15. The method of claim 9, wherein the building the plurality of middle layers of the CNN is to result in a same number of filters for a same output feature map size, and in response to the feature map size being halved, the number of filters is doubled.

16. The method of claim 9, wherein building the top layers of the CNN includes using an inception-residual block that to generate a multi-scale feature map including a plurality of features at different scales.

17. A system for dynamic emotion recognition in unconstrained scenarios, the system comprising:

a three-channel input including a gray-scale face image, a corresponding basic Local Binary Patterns (LBP), and mean LBP feature maps;

a memory that is to store instructions; and a processor communicatively coupled to the memory, wherein when the processor is to execute the instructions, the processor is to:

build a plurality of lower levels of a CNN using the three channel input, wherein filters of the lower levels form pairs in phase;

build a plurality of middle layers of the CNN via a plurality of residual functions;

build a plurality of top layers of the CNN via multi-scale feature extraction that is to extract a plurality of features; and classify the extracted plurality of features.

18. The system of claim 17, wherein to build the lower levels of the CNN, the processor is to:

generate an identical copy of a plurality of linear responses after convolution;

negate results of the convolution;

apply a Concatenated Rectified Linear Unit (CReLU); and max-pool to determine a number of feature maps.

19. The system of claim 17, wherein the processor is to:

perform a final feature abstraction; and classify the final features.

20. The system of claim 17, wherein the multi-scale feature extraction is to increase a width of the CNN.

21. A tangible, non-transitory, computer-readable medium comprising instructions that, when executed by a processor, direct the processor to:

pre-process image data;

build a plurality of lower levels of a CNN using the image data wherein filters of the lower levels form pairs in phase;

build a plurality of middle layers of the CNN via a plurality of residual functions;

build a plurality of top layers of the CNN via multi-scale feature extraction that is to extract a plurality of features; and classify the extracted plurality of features.

22. The computer readable medium of claim 21, wherein to build the lower levels of the CNN, the instructions cause the processor to:

generate an identical copy of a plurality of linear responses after convolution;

negate results of the convolution;

apply a Concatenated Rectified Linear Unit (CReLU); and max-pool to determine a number of feature maps.

23. The computer readable medium of claim 21, wherein to build the plurality of middle layers of the CNN, the instructions cause the processor to reduce redundancy in filters of the CNN via residual functions with reference to the inputs to the middle layers.

24. The computer readable medium of claim 21, wherein the building the plurality of middle layers of the CNN is to increase a depth of the CNN by stacking composite layers specifically designed to fit a residual mapping.

25. The computer readable medium of claim 21, wherein the building the plurality of middle layers of the CNN is to result in a same number of filters for a same output feature map size, and in response to the feature map size being halved, the number of filters is doubled.

* * * * *